Aug. 9, 1932.    J. C. HANDY    1,870,809
SYSTEM FOR LUBRICATING MACHINERY
Filed Jan. 9, 1929
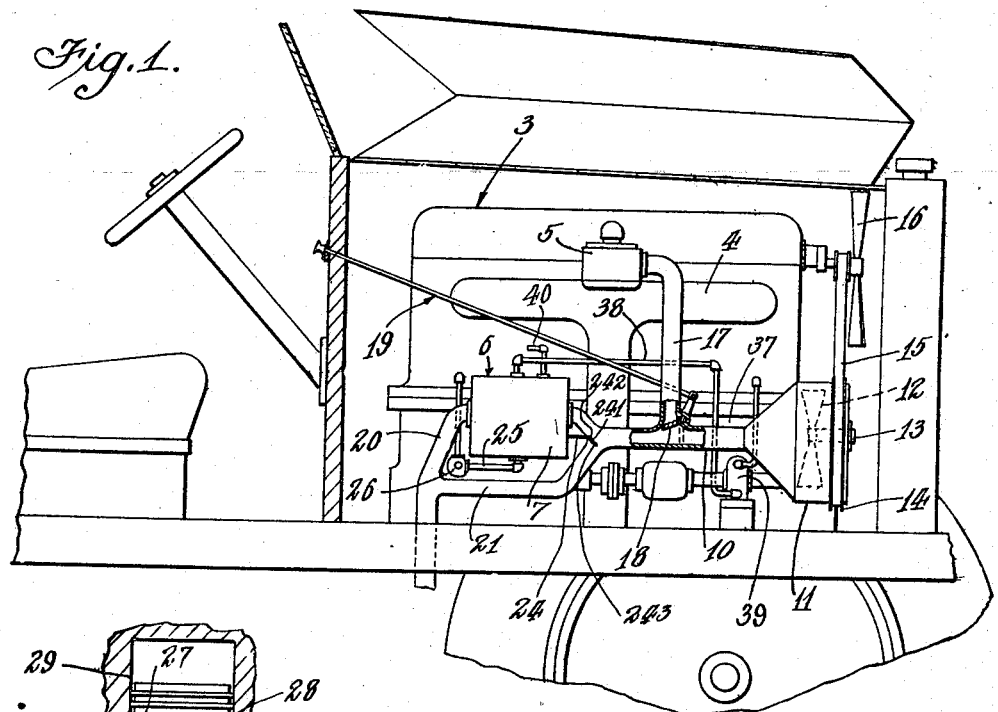
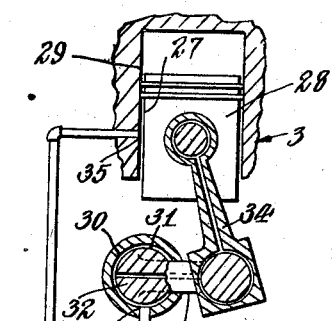
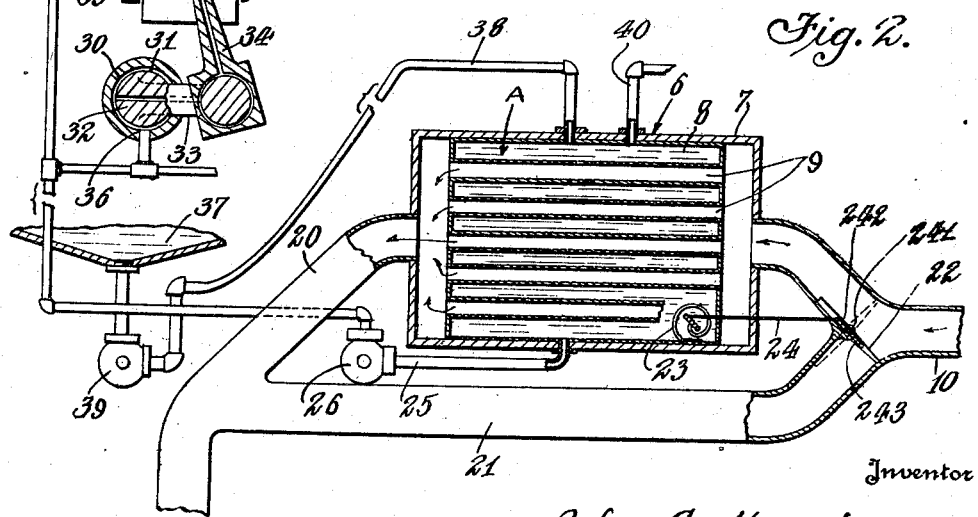

Patented Aug. 9, 1932

1,870,809

UNITED STATES PATENT OFFICE

JOHN C. HANDY, OF BERKELEY, CALIFORNIA, ASSIGNOR TO STANDARD OIL COMPANY OF CALIFORNIA, OF SAN FRANCISCO, CALIFORNIA, A CORPORATION OF DELAWARE

SYSTEM FOR LUBRICATING MACHINERY

Application filed January 9, 1929. Serial No. 331,254.

This invention relates to systems for lubricating machinery, it being used to advantage, particularly, in the lubrication of automotive engines or motors which, as is well known, are subjected to intermittent operation, varying load requirements and atmospheric temperature variations.

For the lubrication of automotive engines, it has been the practice to specify the use of a lubricating oil capable of giving a degree of service under all degrees of temperature and the various loads encountered during normal operation of the engine. Thus, for starting the engine into operation in cold weather a relatively light oil or a heavy oil thinned with kerosene or the like would be provided in order that the lubricant would be of sufficient fluidity for handling cold.

As this lubricant passes through the circulation system of the engine, its temperature gradually rises, as it abstracts heat from the engine, and its viscosity is reduced to a degree where its value as a lubricant may be materially impaired. In any event, the oil specified for use in an automotive engine can not be expected to render maximum lubrication during the transition from a cold starting temperature to the working temperature under full load.

In my copending application Serial No. 330,286, filed January 4, 1929, there is described a dual system of lubrication or, in other words, an arrangement whereby a relatively light oil, capable of giving maximum lubricating satisfaction under relatively low temperatures, is supplied to the engine until working temperatures are approached, whereupon a heavier oil, suitable for use at such working temperatures is substituted for the lighter oil.

In the actual functioning of the above mentioned dual system, the heavy oil that is supplied must be of such viscosity that it can be readily handled by the circulating equipment at temperatures within the range of its first application and at normal crank case temperatures under working conditions, thus imposing a limitation on the degree of viscosity of the oil. Thus, it is conceivable that a heavy oil eminently suited for correct lubrication, because of its high viscosity, might be rejected because of the inability to handle it at the temperatures encountered.

It will appear from the foregoing that there are, thus, two cases in which maximum lubrication may not be obtainable, (1) with a light oil whose viscosity at crank case temperatures renders the oil too fluid, and (2) with a heavy oil when the crank case temperature is such that the oil is too viscous to be handled in the circulation system.

In each of the above mentioned cases the difficulties may be overcome by controlling the temperature of the oil supply so that a light oil may be maintained sufficiently viscous to afford satisfactory lubrication at the higher crank case temperatures, and so that a heavy oil may be maintained sufficiently fluid for handling at the lower crank case temperatures.

The present invention embraces a system for controlling the lubricant characteristics of an oil according to operating requirements.

An object of the invention is to make provision for the supplying of a lubricant, in condition for proper lubrication, to machinery at all times, irrespective of the temperatures of said machinery.

Another object is to maintain the temperature of the oil supply so that the oil delivered to an engine will have a suitable viscosity for lubrication.

Another object is to maintain the temperature of an oil supply so that the oil can be readily handled in the circulation system of the engine.

Another object is to make provision whereby the working conditions of an engine control the viscosity of the lubricant supplied to said engine.

Another object is to make provision for automatic control of the temperature of the oil supply.

The invention in one form would be adaptable to operation in extremely cold climates by the use of a light oil suitable for starting, the temperature and corresponding viscosity of said oil being maintained by artificial cooling as by, for example, a radiating surface or temperature exchange means in communication with the oil supply. The cooling means could be connected with a cold air receiver so that under conditions of heavy load or/and high speed the cooling effect would be proportionately increased, thus preventing any undue reduction in the viscosity of the oil.

The invention in another form would be adaptable for use, in conjunction with the dual oil supply system mentioned above, for reducing the viscosity of the heavy oils employed in said dual system. In certain cases, it is believed that extremely heavy oils would afford most satisfactory lubrication. However, such extremely heavy oils may be too viscous at ordinary crank case temperatures for handling in the oil circulating system of an engine and for introduction to the surfaces requiring lubrication. In such cases, the oil supply would be artificially heated, the source of the heat being preferably the exhaust gases of the engine. Thermostatic devices could be used, if desirable, to prevent overheating of the oil supply and to insure that the oil would be delivered to the engine at suitable degrees of temperature and viscosity.

Other objects and advantages will appear in the subjoined detailed description.

The accompanying drawing illustrates the invention.

Fig. 1 is a fragmental side elevation of an automobile in which the invention is embodied, one side of the hood being shown open and portions being in section.

Fig. 2 is an enlarged view of a portion of Fig. 1, mainly in vertical section. The engine is illustrated diagrammatically.

Referring to the drawing, the engine is indicated at 3, and said engine is provided with an exhaust manifold 4, and a stove or air heater 5 surrounding the manifold 4.

At one side of the engine 3 is mounted a temperature exchange device 6 which may be used for either increasing or decreasing the temperature of the lubricating oil. In this instance, the temperature exchange device 6 comprises an outer chamber 7 and an inner chamber 8 and tubes 9 extend through the chamber 8 and communicate at their ends with the chamber 7 so that the fluid passing through the chamber 7 can flow through the tubes 9 for transferring either heat or cold to the oil, indicated at A, in the chamber 8.

Leading from one end of the chamber 7 is a conduit 10 which is connected at its forward end to a cold air receiver 11. This cold air receiver has its mouth facing forwardly so that when the automobile, in which the invention is installed, is moving forwardly the air will pass into the receiver 11 in volumes proportionate to the speed of the automobile. It may be desirable to increase the flow of air into the receiver 11 by suitable means as, for example, by a fan 12 which is mounted on a shaft 13 provided with a pulley 14. The pulley 14 is engaged by the belt 15 that operates the fan 16 of the engine.

The conduit 10 is provided with a branch 17 which receives heated air from the heater 5. At the point where the branch 17 joins the main conduit, there is provided a valve 18 which can be swung into position to either close the branch 17 and open the main conduit or to close the main conduit and open the branch 17. Thus, either hot or cold air may be caused to flow into the temperature exchange device 6 by appropriate operation of the valve 18. The valve 18 may be operated by any suitable mechanism as, for example, the mechanism indicated at 19.

It is to be understood that, though a hot air source and a cold air source are both shown connected with the temperature exchange device, it may be desirable to provide only one or the other, according to whether the automobile is to be operated at all times in a cold climate or in a hot climate. Accordingly, either the receiver 11 or the conduit branch 17 may be omitted.

The rear end of the chamber 7 exhausts through a conduit 20 and, preferably, a by-pass 21 is provided, connecting the conduit 10 with the conduit 20, so as to enable the hot or cold air, as the case may be, to be passed around the temperature exchange device, when the oil reaches a predetermined temperature. For this purpose a valve 22 is provided at the junction of the conduit 10 with the bypass 21. When the valve 22 is in the position shown in solid lines in Fig. 2, the air passes into the temperature exchange device and, when said valve is turned to the position indicated in dotted lines, the air passes around said temperature exchange device.

If desired the position of the valve 22 may be controlled by a thermostatic device 23 which is connected by a rod 24 to said valve 22. In this instance, the pivot or stem 241 of the valve 22 is provided with oppositely projecting arms 242, 243, to which the rod 24 may be selectively pivoted, according as to whether the valve 22 is to be moved from the position shown in broken lines, in Fig. 2, to the position shown in solid lines by lowering temperatures or by rising temperatures. The thermostatic device 23 need not be described in detail herein, since the construction and operation of such devices are well understood in the art relating thereto. This thermostatic device 23 is mounted in the chamber 8 so that the temperature of the oil will affect said thermostatic device. In this instance, the thermostatic device is positioned in the lower porton of the chamber 8. It suffices to state that when the valve 18 is in position to admit cool air to the chamber 7, the thermostatic device 23 will be operated by increasing temperatures to move the valve 22 into position to admit the cold air to the chamber 7 and the thermostatic device will be operated by decreasing temperatures into position to bypass the cold air around the chamber 7. To operate in this manner, the thermostatic device will be hooked up to the valve 22 in the manner shown in Fig. 2. Also, when the valve 18 is in position to pass heated air to the chamber 7, the thermostatic device 23 will be operated by falling temperatures to move the valve 22 into position to admit the heated air to the chamber 7, and said thermostatic device will be operated by rising temperatures to move the valve 22 into position to bypass the heated air around the chamber 7.

To obtain this result, the rod 24 will be pivotally connected to the arm 243, instead of the arm 242.

An oil supply line 25 communicates with the lower portion of the chamber 8 and in said line is a pump 26. The line 25 supplies oil to the friction surfaces of the machinery, said friction surfaces being illustrated, in this instance, by the periphery 27 of the motor piston 28, the cylinder wall 29 of the motor, the wall 30 of the engine bearing, and the periphery 31 of that portion of the shaft 32 that turns in said bearing. The shaft 32 is provided with a crank 33 operated by a pitman 34 that connects with the piston 28. The oil line 25 communicates through a port 35 with the surfaces 27, 29, and said oil line communicates through a port 36 with the surfaces 30, 31.

There is the usual oil sump 37 below the operating parts of the engine to catch the surplus oil that runs from the operating parts and the oil is carried from the sump 37 back to the upper portion of the chamber 8 by a pipe line 38 in which may be placed a pump 39.

The foregoing will make clear the construction and operation of the invention and, briefly stated, the operation is as follows: Assuming that the automobile, in which the invention is installed, is to operate under conditions that make it desirable to employ a relatively light lubricating oil, the lubrication circulating system will be supplied with the light oil and the valve 18 will be closed so that cool air will pass through the conduit 10.

Assuming, at the start, that the oil is of substantially the proper temperature for most efficient lubrication of the engine, operation of the engine will, of course, tend to raise the temperature of said oil. The rod 24 will be connected with the arm 243. As the temperature of the oil rises, the thermostatic device 23 will move the valve 22 from the dotted line position in Fig. 2 to the solid line position, thus permitting cool air to flow from the conduit 10 through the chamber 7, so as to reduce the temperature of the oil.

As the temperature of the oil lowers, the valve 22 will be moved toward the dotted line position, thus to bypass a part or all of the cool air around the chamber 7. Thus the temperature range of the relatively light oil will be automatically controlled by the thermostatic device 23.

If the operating conditions of the automobile are such that it is advisable to employ a relatively heavy lubricating oil, the lubrication system will be supplied with the heavier oil and the valve 18 will be swung into the dotted position indicated in Fig. 1 so that the manifold 10 will be supplied with heated air from the heater 5 after, of course, the engine has been in operation a sufficient length of time to heat the air passing through the heater. This heavy oil, being too viscous to be handled in the circulation system, requires to be heated and, accordingly, the rod 24 will be connected with the arm 242 as shown in Fig. 2. The valve 22 being in the position indicated in solid lines in Fig. 2, the hot air will pass from the conduit 10 through the chamber 7 to raise the temperature of the body of oil in the chamber 8.

As the temperature of the oil rises, the valve 22 will be operated by the thermostatic device 23 toward the dotted line position, indicated in Fig. 2, so as to cause all or a portion of the hot air to bypass around the chamber 7. If the temperature of the oil falls below a predetermined degree, the thermostatic device 23 will operate to move the valve 22 into a position to again admit hot air to the chamber 7, to thereby again raise the temperature of the oil.

Whether the oil be heavier or lighter, it is forced by the pump 26 to the friction surfaces and is returned by the pump 39 to the chamber 8, thus circulating said oil to the parts that need lubrication.

From the foregoing it will now appear that many variations in the construction are possible without departing from the spirit and scope of the invention which, in its broader aspect, involves the preconditioning of lubricating oil in accordance with operating requirements, and the controlling of the viscosity of the oil to afford maximum lubricating efficiency.

It may be desirable to provide a vent for the chamber 8 so as to permit of vapors, such as gasoline vapors, escaping or being drawn off from said chamber 8, and such a vent is indicated at 40. Thus, any gasoline that, in the course of operation, contaminates the oil, will be vaporized by the heat of the oil and the vapors will escape through the vent 40.

I claim:

1. A system for lubricating an engine comprising chambers in temperature exchange relation, one of said chambers for oil, a conduit connected with the other chamber, an air receiver connected with said conduit, a branch to said conduit, an air heater connected with said branch, a valve at the junction of the branch with the conduit operable into positions to permit air only from the receiver or heater to pass through the conduit, a by-pass connected with the conduit, a valve at the junction of the by-pass and conduit operable to control the relative amounts of air passing to said other chamber and by-pass, a thermostatic device in the first mentioned chamber operably connected with the last mentioned valve, and a means to conduct the oil from the first mentioned chamber to friction surfaces of an engine.

2. A system for lubricating an engine comprising chambers in temperature exchange relation, one of said chambers for oil, a vent in the upper portion of the oil chamber for gasoline vapors, a conduit connected with the other chamber, an air receiver connected with said conduit, a branch to said conduit, an air heater connected with said branch, a valve at the junction of the branch with the conduit operable into positions to permit air only from the receiver or heater to pass through the conduit, a by-pass connected with the conduit, a valve at the junction of the by-pass and conduit operable to control the relative amounts of air passing to said other chamber and by-pass, a thermostatic device in the first mentioned chamber operably connected with the last mentioned valve, and a means to conduct the oil from the first mentioned chamber to friction surfaces of the engine.

Signed at San Francisco, Calif. this 29th day of December, 1928.

JOHN C. HANDY.